United States Patent [19]
Tadokoro et al.

[11] Patent Number: 5,872,690
[45] Date of Patent: Feb. 16, 1999

[54] MAGNETIC TRANSDUCER AND MAGNETIC RECORDING DEVICE UTILIZING MATERIAL IN WHICH UNDIRECTIONAL ANISOTROPY CAN BE FORMED

[75] Inventors: Shigeru Tadokoro, Odawara; Takao Imagawa, Mito; Katsuro Watanabe; Akira Kumagai, both of Hitachi, all of Japan

[73] Assignee: Hitachi, Ltd., Tokyo, Japan

[21] Appl. No.: 893,676

[22] Filed: Jul. 11, 1997

Related U.S. Application Data

[63] Continuation of Ser. No. 507,171, Jul. 26, 1995, abandoned.

[30] Foreign Application Priority Data

Aug. 2, 1994 [JP] Japan .................................. 6-181499
May 16, 1995 [JP] Japan .................................. 7-116894

[51] Int. Cl.$^6$ ....................................................... G11B 5/39
[52] U.S. Cl. ........................................................... 360/113
[58] Field of Search ..................................... 360/126, 113; 324/252; 338/32 R

[56] References Cited

U.S. PATENT DOCUMENTS

| | | | |
|---|---|---|---|
| 5,422,571 | 6/1995 | Gurney et al. | 360/113 |
| 5,471,358 | 11/1995 | Tadokoro et al. | 360/113 |
| 5,552,949 | 9/1996 | Hashimoto et al. | 360/113 |

*Primary Examiner*—Craig A. Renner
*Attorney, Agent, or Firm*—Kenyon & Kenyon

[57] ABSTRACT

A magnetic laminated film used for a magnetic transducer is constructed in such a way that a ferromagnetic film as a ferromagnetic body is made of, for example, a Ni—Fe alloy film, formed on a substrate made of, for example, glass, and an antiferromagnetic film as an antiferromagnetic body having crystal structure of body-centered cubic lattice, for example, made of a Cr alloy film is laminated on the top layer. Further, a magnetic transducer using the magnetic laminated film is applied to a magnetic head in a magnetic recording device in accordance with the present invention.

16 Claims, 6 Drawing Sheets

MAGNETIC TRANSDUCER AND MAGNETIC RECORDING DEVICE UTILIZING MATERIAL IN WHICH UNDIRECTIONAL ANISOTROPY CAN BE FORMED

This application is a continuation of application Ser. No. 08/507,171 filed on Jul. 26, 1995 abandoned.

BACKGROUND OF THE INVENTION

1. Field of the Invention

The present invention relates to a magnetic transducer utilizing unidirectional anisotropy and to a magnetic recording device for reading and writing information using said magnetic transducer.

2. Description of the Related Art

Unidirectional anisotropic phenomenon has been well known. This phenomenon takes place as a result of interaction when a ferromagnetic body contacts an antiferromagnetic body caused by bonding action of exchanging magnetic momentums in the boundary surface between them both. It is disclosed, for example, in Japanese Patent Application Laid-Open No. 54-10997 (1979) that exchange coupling between a ferromagnetic Ni—Fe alloy film and an antiferromagnetic Fe—Mn alloy film causes unidirectional an isotropy and consequently the B-H loop of the Ni—Fe alloy thin film is shifted from the origin. Further, as to an antiferromagnetic material showing unidirectional an isotropy other than the Fe—Mn alloy, a gamma-phase Mn alloy is disclosed in U.S. Pat. No. 4,103,315. In the patent, materials such as NiO, $Fe_2O_3$, Ni—Mn are disclosed as other antiferromagnetic materials.

Furthermore, as to an antiferromagnetic body used for a magnetic-resistance sensor, a Mn alloy having crystal structure of face-centered cubic lattice is disclosed in Japanese Patent Application Laid-Open No. 6-76247 (1994). Particularly, alloys of Ni—Mn, Ir—Mn, Pd—Mn, Pt—Mn, Rh—Mn and alloys added with a specified element are described. The conventional materials showing unidirectional an isotropy described above are alloys of gamma phase and face-centered cubic lattice except oxide metals.

According to the conventional technology, a magnetic transducer constructed from an antiferromagnetic Fe—Mn film showing unidirectional an isotropy and a ferromagnetic Ni—Fe film has a lot of difficulties in practical use since the antiferromagnetic Fe—Mn film has an extremely low corrosion resistivity. Further, when a Fe—Mn—Cr film, which is obtained by adding Cr to a Fe—Mn alloy, is used, there is a problem in that the thermal temperature is decreased since the Neel temperature of the antiferromagnetic film is lowered with Cr.

Although the oxide metal antiferromagnetic film, such as NiO film, has a thermal resistivity of approximately 200° C. and a good corrosion resistivity, there is a problem in using a magnetic transducer since the oxide metal is small in electric conductivity. The Ni—Mn film also has a problem in manufacturing since it requires a long time thermal treatment to obtain unidirectional an isotropy. As described above, the conventional magnetic transducers have disadvantages in corrosion resistivity, electric conductivity, thermal resistivity, productivity, and so on.

SUMMARY OF THE INVENTION

Object of the Invention

Therefore, the first object of the present invention is to provide a magnetic transducer using an antiferromagnetic film having crystal structure of body-centered cubic lattice which leads to improvement in productivity, reliability and thermal resistivity.

Among the antiferromagnetic films having the crystal structure of body-centered cubic lattice described above, for example, the antiferromagnetic film made of a Cr alloy has a limitation in inducing capability of unidirectional an isotropy. Therefore, when the Cr alloy is used for the antiferromagnetic film, the applicable range of the magnetic transducer is limited The second object of the present invention is to provide a magnetic transducer having crystal structure of body-centered cubic lattice which is widely applicable.

The third object of the present invention is to improve corrosion resistivity, thermal resistivity and productivity of a magnetic transducer of spin-valve structure.

The fourth object of the present invention is to provide a magnetic recording device excellent in corrosion resistivity, thermal resistivity and productivity.

Method of Solving the Problems

The first object of the present invention can be attained by providing a magnetic transducer having a ferromagnetic body and an antiferromagnetic body fixed to the ferromagnetic body, wherein at least a part of the antiferromagnetic body to induce unidirectional an isotropy in the ferromagnetic body has crystal structure of body-centered cubic lattice. Further, the first object of the present invention can be attained by providing a magnetic transducer having an isolation film formed by laminating a bias film and a non-magnetic material in this order on a substrate, a ferromagnetic film having a magnetic-resistance effect laminated on said isolation film, and an antiferromagnetic film laminated on said ferromagnetic film, wherein the antiferromagnetic film has crystal structure of body-centered cubic lattice.

Furthermore, the first object of the present invention may be attained by providing a magnetic transducer having a first laminated film formed by laminating a bias film for applying lateral bias magnetic field, an isolation film and a magnetic-resistance effect film in this order on a substrate, a second laminated film formed by laminating a ferromagnetic film for applying lateral bias magnetic field and an antiferromagnetic film in this order on the first laminated film, and an electrode film laminated on the second laminated film, wherein the ferromagnetic film is adhered closely to the antiferromagnetic film, the antiferromagnetic film for inducing unidirectional an isotropy in said ferromagnetic film having crystal structure of body-centered cubic lattice.

On the other hand, the second object of the present invention can be attained by using a Cr—Mn alloy for the antiferromagnetic film having crystal structure of body-centered cubic lattice, and the content of Mn in the Cr—Mn alloy is within the range of 30 to 70 atom %. Further, the second object of the present invention can also be attained by the Cr—Mn alloy which is an allay composed of at least three elements, such as Cr, Mn and a proper additive element. Especially, it is preferable that the additive element is at least one kind of element selected from the group of Co, Ni, Cu, Ag, Au and platinum group elements.

The third object of the present invention can be attained by laminating a second ferromagnetic film of which the direction of magnetization is freely changed corresponding to an external magnetic field, a non-magnetic film made of a nonmagnetic material for magnetically isolating said second ferromagnetic film, a first ferromagnetic film of which the direction of magnetization is fixed by an antiferromagnetic film, antiferromagnetic film and divided electrodes in this order on a substrate, wherein the antiferromagnetic film has crystal structure of body-centered cubic lattice. It may be preferable that the first ferromagnetic film has crystal structure of body-centered cubic lattice.

Further, the fourth object of the present invention can be attained by providing a magnetic recording device which comprises a magnetic recording medium for recording information, a magnetic head for reading and writing the information having a magnetic transducer constructed from a ferromagnetic body and an antiferromagnetic body fixed to the ferromagnetic body, wherein at least a part of the antiferromagnetic body to induce unidirectional an isotropy in the ferromagnetic body has crystal structure of body-centered cubic lattice, an actuating means for moving the magnetic head to a proper position on the magnetic recording medium, and a control means for controlling transmission and reception of the information to be read or written using the magnetic head and movement of the actuating means.

The present invention makes it possible for the first time to provide a magnetic transducer in which unidirectional an isotropy is induced by exchange coupling through adhering an antiferromagnetic film having crystal structure of body centered cubic lattice closely to a ferromagnetic film. Employing the antiferromagnetic film having crystal structure of body-centered cubic lattice leads to (1) improvement of the productivity due to the fact that heat treatment is not necessary, (2) improvement of the reliability due to excellent corrosion resistivity of the antiferromagnetic film, (3) improvement of the thermal resistivity due to the use of a Cr alloy of body centered cubic lattice for the non-magnetic film. That is, the new type magnetic transducer, which has a potential to enrich the technology of this field, produces the above advantages, and the field using magnetic transducers can be expanded by selecting the new magnetic transducer or a conventional magnetic transducer depending on the purpose of use.

Since chromium is an antiferromagnetic metal having Neel temperature of approximately 30° C. which is room temperature, it is difficult to widely use Cr at the present time. In order to increase the Neel temperature high enough to expand the field of use, it is considered to add a certain additive element to increase the Neel temperature. As one of the methods, it is known that the Neel temperature can be increased by adding a proper amount of Mn to Cr in a case of an alloy of bulk material. Therefore, it is possible to induce unidirectional an isotropy by laminating a Cr—Mn alloy film having a proper content on a ferromagnetic thin film.

In order to further expand the field of use, it is possible to increase the exchange coupling field by laminating an alloy of Cr—Mn alloy added with at least one kind of element selected from the group of Co, Ni, Cu, Ag, Au and platinum group elements on a ferromagnetic film. Although it is thought that the effect of the additive element is caused by change in spin alignment of the antiferromagnetic film due to the additive element, the details are not known yet. Therewith, the applicable field of the new magnetic transducer can be expanded It is clear that a magnetic transducer of spin-valve structure using the antiferromagnetic film having crystal structure of body-centered cubic lattice described above or a magnetic recording device using the magnetic transducer is excellent in corrosion resistivity, in thermal resistivity and in productivity.

DETAILED DESCRIPTION

Embodiments of the present invention will be described in detail below, referring to the accompanying drawings.

Substantially, only chromium alloys are antiferromagnetic metals which have crystal structure of body-centered cubic lattice stable at a temperature above room temperature and Neel point above room temperature. Among the antiferromagnetic metals of Cr alloys having crystal structure of body-centered cubic lattice, Cr—Mn alloys are alloys showing a very high Neel temperature in a bulk material.

This fact is described in, for example, an article entitled "Antiferromagnetism in Disordered B.C.C. Cr—Mn Alloys" by Y. Hamaguchi et al., Journal of the Physical Society of Japan, Vol. 19, No. 10, pages 1849 to 1856, (1964), wherein it is described that Cr and Cr—Mn alloys are antiferromagnetic materials having crystal structure of body-centered cubic lattice, and the Neel temperature of antiferromagnetism is increased up to approximately 800K by adding Mn.

In order to clarify the component of material and the operating characteristic as a magnetic transducer when the Cr alloy is applied to the magnetic transducer, various kinds of magnetic laminated films having structures of laminated films shown in the following figures are prepared using a radio frequency sputtering apparatus, and then magnetic transducers are formed using the magnetic laminated films.

Figure 1:
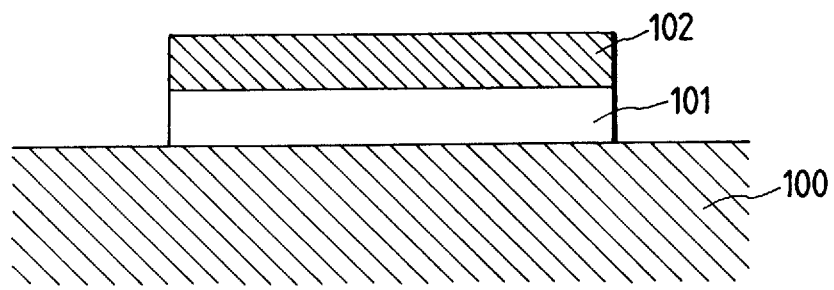
FIG. 1 is a cross-sectional view showing the structure of one embodiment of a magnetic laminated film in accordance with the present invention.

FIG.1 is a cross-sectional view showing the structure of one embodiment of a magnetic laminated film in accordance with the present invention. The magnetic laminated film shown in the figure is formed by vapor-depositing Ni—Fe/Cr—Mn films on a glass substrate using an alloy target composed of $Ni_{82}Fe_{18}$ and a Cr target attached with a Mn chip on the surface.

The magnetic laminated film is constructed in such a way that a ferromagnetic film 101 as a ferromagnetic body made of, for example, a Ni—Fe alloy film is formed on a substrate 100 made of, for example, glass, and an antiferromagnetic film 102 as an antiferromagnetic body having crystal structure of body centered cubic lattice, for example, made of a Cr alloy film is laminated on the top layer. The film thickness of the ferromagnetic film 101 is 40 nm, and the film thickness of the antiferromagnetic film is 50 nm. When the film is vapor deposited on the substrate, magnets are attached to both ends of the substrate so that the magnetic field in the middle of the substrate becomes approximately 40 Oe.

The magnetic field described above has a function to magnetize the Ni—Fe film as a ferromagnetic film to one direction when the film is vapor-deposited, which induces unidirectional an isotropy in the deposited film. As well known in a laminated film of a ferromagnetic film having unidirectional an isotropy and an antiferromagnetic film, the Cr—Mn film deposited on the Ni—Fe alloy shifts the magnetizing curve of the Ni—Fe film from the origin. The magnitude of the shift is measured with the magnitude of the magnetic field in exchange coupling between the Cr—Mn film and the Ni—Fe film. This magnetic field is called an exchange coupling field or magnetic exchange coupling field, hereinafter referred to as "exchange coupling field".

In preparation of the magnetic laminated film here and the magnetic transducer in each of the embodiments, heat treatment is not performed.

Comparison is made on the exchange coupling fields for two kinds of laminating methods, a case of forming a Cr—Mn film on a Ni—Fe film and a case of forming a Ni—Fe film on a Cr—Mn film.

Figure 2:
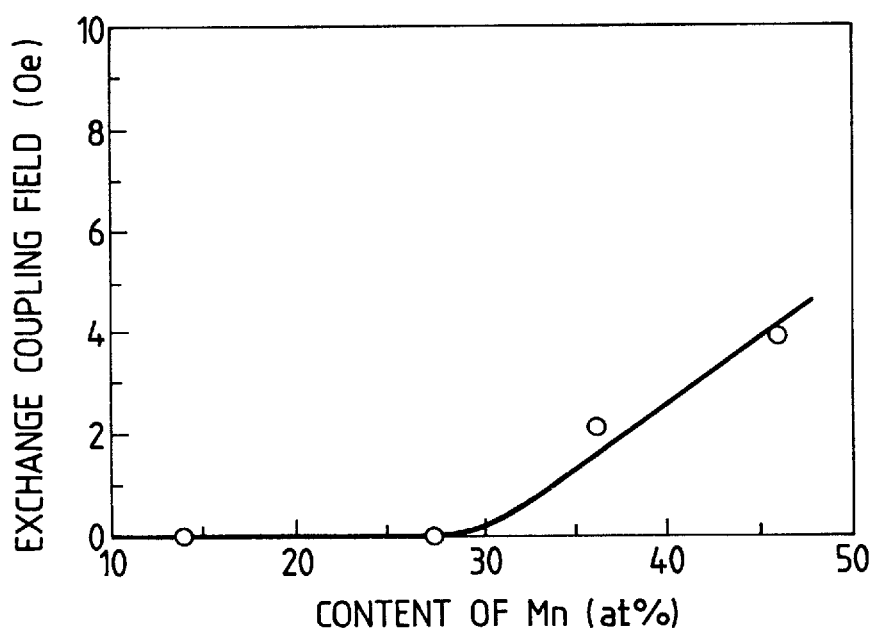
FIG. 2 is a graph showing the relationship between Mn content in a Cr—Mn film and magnitude of exchange coupling field.

FIG.2 is a graph showing the relationship between Mn content in a Cr—Mn film and magnitude of exchange coupling field.

This figure shows the relationship between Mn content in a Cr—Mn alloy and exchange coupling field, in the case of forming a Cr—Mn film on a Ni—Fe film. When the content of Mn is small, the exchange coupling field does not take place. When the content of Mn exceeds 30%, the exchange coupling field takes place. From this result, it can be said that approximately 30% of the content of Mn in the Cr—Mn alloy film is the limit to induce unidirectional an isotropy by contacting a Ni—Fe film. Herein, the % above means atom %. The % used below also means atom %.

In the case of forming a Cr—Mn film on a Ni—Fe film, it is confirmed through an X-ray diffraction method that the CrMn film is of body-centered cubic lattice. Although the Ni—Fe film is of face-centered cubic lattice and has a crystal structure different from the body-centered cubic lattice of the Cr—Mn film, the shortest distance between atoms on the surface (1 1 1) of the Ni—Fe film is 2.51 angstroms and the shortest distance between atoms on the surface (1 1 0) of the Cr—Mn film is approximately 2.5 angstroms which is near the shortest distance between atoms on the surface (1 1 1) of the Ni—Fe film. Therefore, it is considered that the Cr—Mn film is epitaxially grown on the Ni—Fe film to form the Cr—Mn film of body-centered cubic lattice.

On the other hand, in the case of forming the Ni—Fe film on the Cr—Mn film, the exchange coupling fields over the whole contents in FIG.2 are 0 Oe. This is because in the case of forming the Ni—Fe film on the Cr—Mn film, the Cr—Mn film is formed on the glass substrate.

Figure 3:
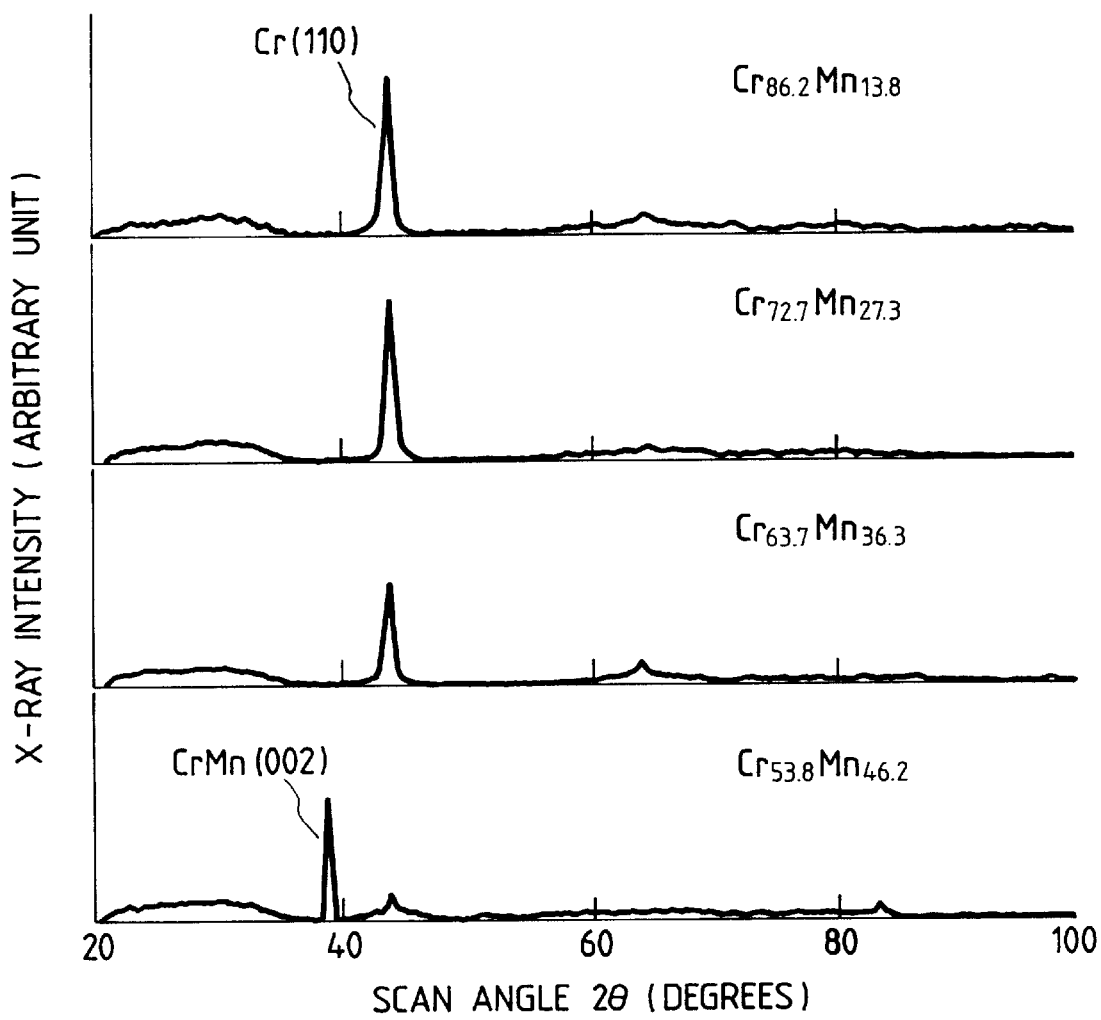
FIG. 3 is a chart showing an X-ray diffraction profile of a Cr—Mn film formed on a glass substrate.

FIG.3 is a chart showing an X-ray diffraction profile of a Cr—Mn film formed on a glass substrate. This is a result of X-ray diffraction of a Cr—Mn film formed on a glass substrate. The abscissa indicatens scan angle 2θ and the ordinate indicates intensity of diffracted X-ray in an arbitrary unit. The X-ray source is kα line of Cu. In this figure, the peak denoted by Cr (1 1 0) means the diffracted line from the surface (1 1 0) of Cr in the body-centered cubic lattice. On the other hand, the peak denoted by Cr—Mn (0 0 2) means the diffracted line from the surface of (0 0 2) of the Cr—Mn inter-metallic compound (crystal structure of body-centered cubic lattice).

It can be understood from the figure that although the crystal structure of the film is body-centered cubic lattice up to Mn content in the Cr—Mn film of 36%, the crystal structure changes to Cr—Mn phase when the Mn content becomes 46%. From this result, in the case of forming the Cr—Mn film on the glass substrate, it becomes difficult to form body centered cubic lattice as the content of Mn becomes large. It can be said that the reason why exchange coupling is not induced in a case of high Mn content, that is, in a case where the Cr—Mn film is formed under the Ni—Fe film, is because the crystal structure of the Cr—Mn film does not form body centered cubic lattice.

However, if a stable Cr—Mn alloy film of body-centered cubic lattice can be formed by a proper base film or through a proper forming condition, the exchange coupling field can be induced even in a case of forming the Cr—Mn (antiferromagnetic) film under the Ni—Fe (ferromagnetic) film. That is, although the upper limit of Mn content cannot be determined from these experimental results, it can be estimated from the phase diagram of the bulk alloy that the upper limit of the Mn content to form body-centered cubic lattice is approximately 70%.

Therefore, in order to induce unidirectional an isotropy in a Cr—Mn film with a Ni—Fe film, the upper limit of the Mn content in the Cr—Mn alloy film is approximately 70% at maximum.

It is possible to obtain a proper exchange coupling field by combination of the Cr—Mn alloy having Mn content of 30% to 70% and the Ni—Fe film. However, in regard to Cr—Mn—M alloy films made by adding a third additive element M to Cr—Mn alloy films, the relationship between the content of the alloy and the exchange coupling field has been studied in order to obtain a further large exchange coupling field and expanding the applicable field. That is, an antiferromagnetic film made of Cr—Mn—M having body-centered cubic lattice is formed and studied by attaching a chip of additive element M on a Cr—Mn target.

Figure 4:
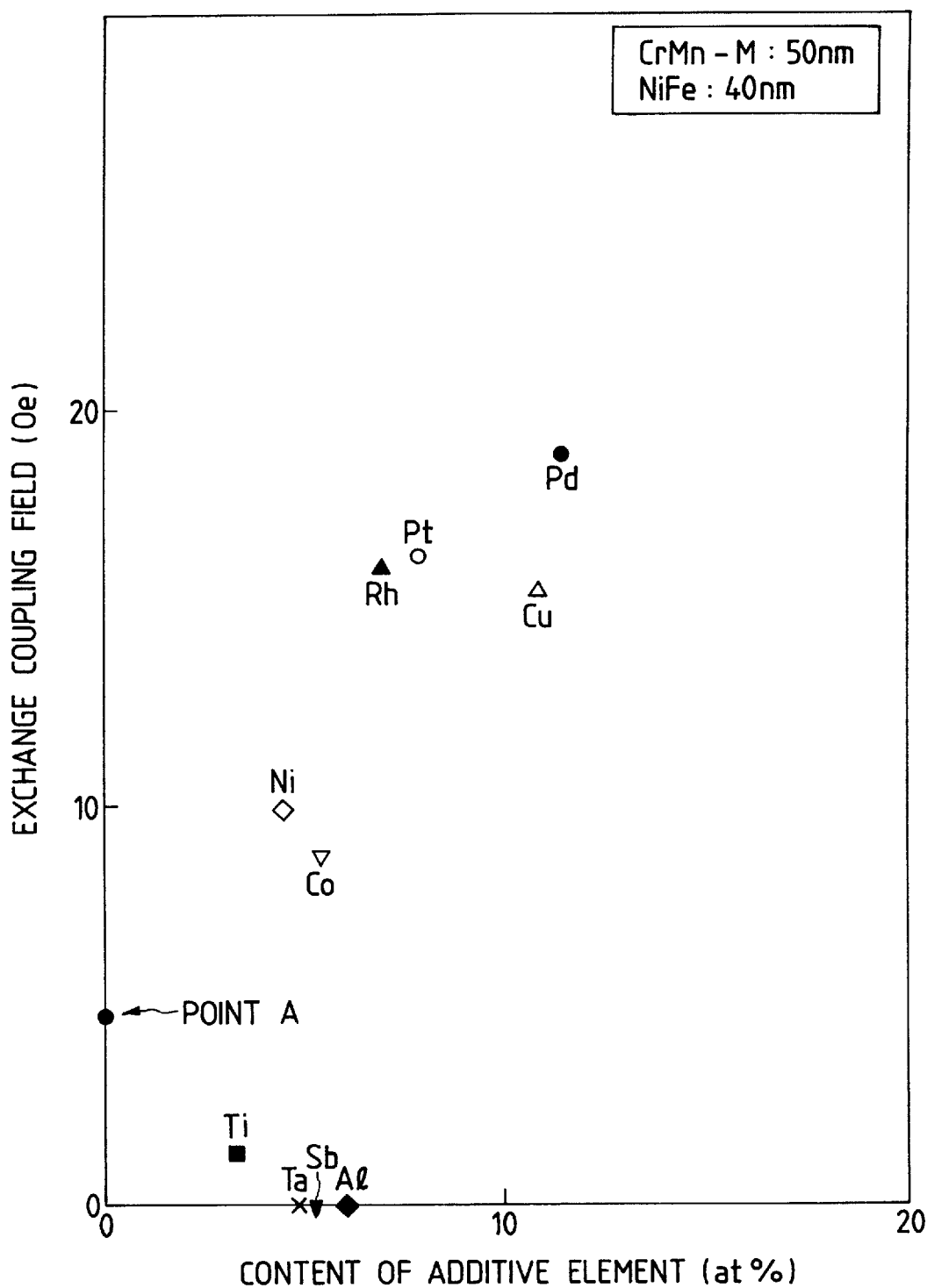
FIG. 4 is a graph showing the change in exchange coupling field when an additive element is added to a Cr—Mn film.

FIG.4 is a graph showing the change in exchange coupling field when an additive element is added to a Cr—Mn film. The graph shows the magnitudes of exchange coupling field when various elements are added to Cr—Mn. The point A in the figure indicates the value of exchange coupling field for a Cr—Mn film containing Mn content of approximately 50% formed on a Ni—Fe film without additive element M. The base material of Cr—Mn alloy itself is a stable alloy having crystal structure of body-centered cubic lattice. Therefore, it is considered that the alloy composed of three elements or more made by adding an element to a base material of Cr and Mn is also an alloy having crystal structure of body-centered cubic lattice.

An experiment has revealed that the exchange coupling field is substantially increased by adding, for example, a platinum group element such as Pt, Rh or Pd, or Co, Ni, Cu, Ag, Au or the like as the additive element M. On the other hand, it is revealed that the exchange coupling field becomes nearly 0 (zero) Oe by adding a very small amount of element such as Al, Ti, Sb, Ta or the like to the Cr—Mn alloy.

Although the experimental results shown here are for cases of adding one kind of element, it can be easily suggested that unidirectional an isotropy is also induced by laminating a ferromagnetic film and a multi-phase alloy thin film plurally added with two or more kinds of metallic elements such as Pt, Pd, Co, Cu and the like.

Figure 5:
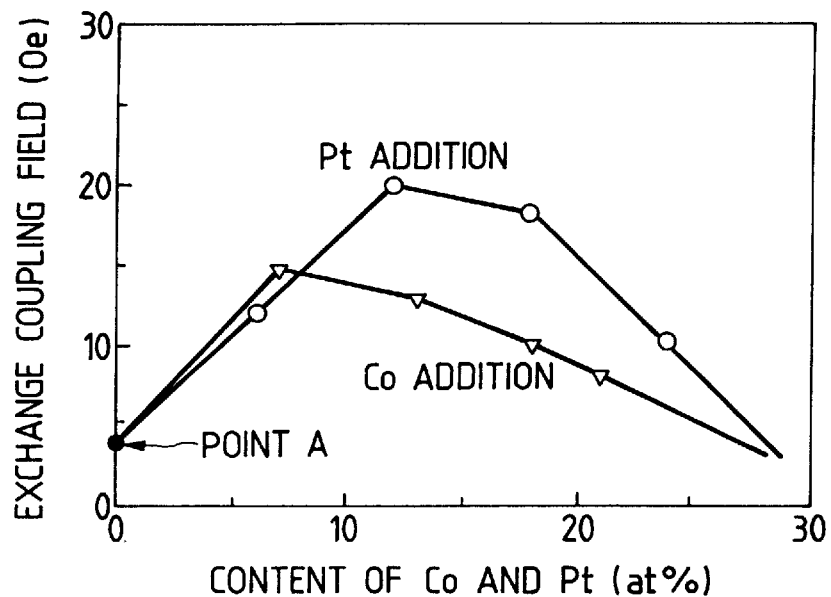
FIG. 5 is a graph showing the dependence of exchange coupling field on composition when Co or Pt is added to a Cr—Mn film.

FIG.5 is a graph showing the dependence of exchange coupling field on composition when Co or Pt is added to a Cr—Mn film. The graph shows the exchange coupling field when Co or Pt is added to a Cr—Mn alloy containing approximately 50% of Mn.

In a case of adding a Co, the exchange coupling field L becomes maximum at Co content of approximately 8%, and then decreases as Co content increases. In a case of adding Pt, the exchange coupling field becomes maximum at a Pt content of approximately 12%, and then decreases as a Pt content increases. The maximum values are approximately 20 Oe in the case of adding Pt and approximately 15 Oe in the case of adding Co. In the both cases, when nearly 30% of additive elements are added, the exchange coupling fields become small From these results, it can be said that the upper limit of content of additive element to a Cr—Mn film is 30%.

Figure 6:
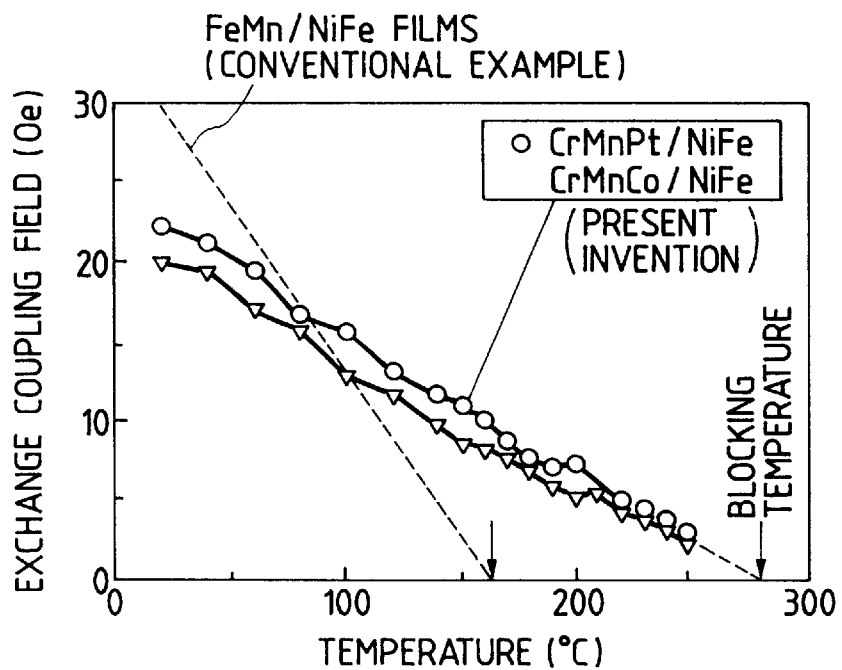
FIG. 6 is a graph showing the dependence of exchange coupling field on temperature when a Cr—Mn—Pt film or a Cr—MnCo film is laminated on a Ni—Fe film.

FIG.6 is a graph showing the dependence of exchange coupling field on temperature when a Cr—Mn—Pt film or a Cr—MnCo film is laminated on a Ni—Fe film. This experiment is obtained by measuring from the reverse side of a substrate by Kerr effect using a laser beam having a spot diameter of approximately 10, um.

Although there are some differences in the absolute values of magnitude of exchange coupling field between this experimental result and the results shown in FIG.4 and FIG.5, this is not a problem comparing the present invention with a result of a conventional film. As shown in the figure, the exchange coupling field monotonously decreases as the temperature increases. In general, the temperature at which unidirectional an isotropy disappears is called a blocking temperature. This temperature is one of indexes to express performance of a magnetic laminated film constructed from a ferromagnetic film and an antiferromagnetic film.

The blocking temperature for the case of laminating a Cr—Mn—Pt film or a Cr—Mn—Co film on a Ni—Fe film according to the present invention is 280° C., as shown in the figure. For a typical conventional example of laminating a Fe—Mn film on a Ni—Fe film, the blocking temperature is approximately 170° C. It can be understood that the Cr—Mn/Ni—Fe film according to the present invention has a higher blocking temperature than the conventional Fe—Mn/Ni—Fe film. Both the film according to the present invention and the conventional film have no problem as far as they are used within a normal temperature range. However, it can be said from this standpoint that the magnetic transducer according to the present invention capable of use at a temperature range higher than 170° C. expands the field of use.

Before describing embodiments, magnetic transducers in conventional technology will be described in order to facilitate understanding.

A magnetic transducer called a magneto-resistance sensor or head is disclosed This magneto-resistance sensor (hereinafter, referred to as "MR sensor") is a sensor which converts magnetic signals to voltage signals using resistivity change in an MR element made of a magneto-resistant material to read out with a high sensitivity information (data) recorded in a magnetic recording medium (hereinafter, referred to as "medium") with a high density as the magnetic signals.

The MR sensor is applied to a read-out head for high density recording for three reasons. That is, the first reason is that the output voltage by detecting magnetic flux change from the medium is large and increases in proportion to the detected current. The second reason is that magnetic signals recorded in a high linear density can be regenerated with a proper magnetic shielding. The third reason is that the regenerated output of the MR sensor is independent of the relative velocity between the sensor and the medium. Especially, by the third reason, in a magnetic disk device having a disk of small diameter in which the relative velocity between the magnetic head and the medium is small, the head can output a higher power compared to a conventional head of electromagnetic inductive type.

It is disclosed that in the conventional technology, bias magnetic fields in two directions are applied to an MR element in order to operate an,MR sensor with low noise and low wave distortion. In order to make the response to magnetic flux from a medium linear, a lateral bias magnetic field is applied to the magneto-resistance effect film in the MR sensor. The lateral bias magnetic field is perpendicular to the surface of the medium, and parallel to the surface of the MR element. The lateral magnetic field is applied with a magnetic film made of a magnetic material vapor-deposited through an isolation film for magnetically insulating near the MR element.

The other bias magnetic field is called as a longitudinal magnetic field and applied parallel both to the surface of the medium and to the longitudinal direction of the MR element. The purpose of the longitudinal magnetic field is to suppress Barkhausen noise produced by random behavior of magnetic domains in the MR element. The longitudinal magnetic field is applied by magnets or an exchange-coupled bias magnetic field. The exchange-coupled bias magnetic field is the longitudinal magnetic field by the unidirectional an isotropy which is produced by exchange coupling between the MR film as a ferromagnetic film and an antiferromagnetic film.

A method of applying a longitudinal magnetic field using a magnet film is disclosed in Japanese Patent Application Laid-Open No. 3-125311 (1991). In this method, a magneto resistance effect film exists only in the portion for converting magnetic signals in the middle position, and magnets are placed in both end sides of the magneto resistance effect film to apply the longitudinal bias magnetic field to the magneto-resistance effect film in the middle position.

An embodiment of a magnetic transducer according to the present invention will be described below.

Figure 7:
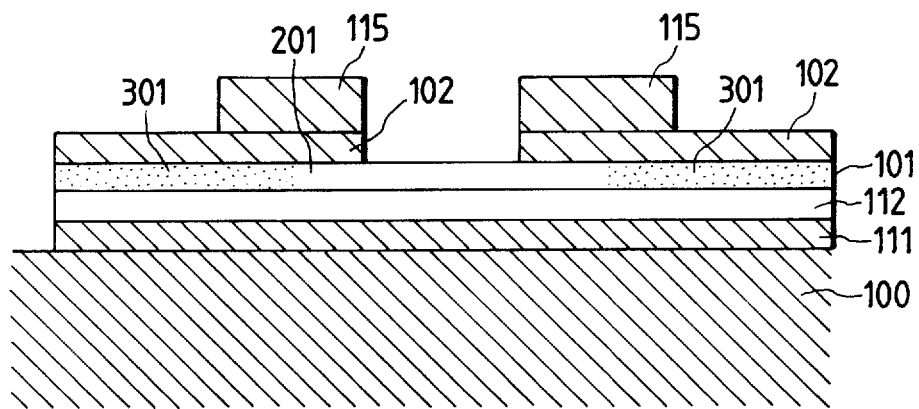
FIG. 7 is a cross-sectional view showing the structure of one embodiment of a magnetic transducer using a magnetic laminated film in accordance with the present invention.

FIG.7 is a cross-sectional view showing the structure of one embodiment of a magnetic transducer using a magnetic laminated film in accordance with the present invention. As shown in the figure, the magnetic transducer is constructed from a substrate 100, a bias film 111 made of, for example, Ni—Fe—Nb for applying a bias magnetic field, an isolation film 112 made of, for example, a non-magnetic material such as Ta, a ferromagnetic film 101 having magneto-resistance effect of which electric resistance varies corresponding to change in magnetic field, an antiferromagnetic film 102 having crystal structure of body-centered cubic lattice, and an electrode 115. Both of the antiferromagnetic film 102 and the electrode 115 are divided as shown in the figure. The ferromagnetic film 101 is formed of, for example, a Ni—Fe film, and is called a magneto-resistance effect film. The ferromagnetic film 101 is connected to the electrode 115 through the antiferromagnetic film 102.

Current for detecting change in the electric resistance is conducted between the divided electrode 115 and the divided electrode 115 to detect the regenerated voltage converted. Therefore, the portion between the electrode 115 and the electrode 115 is the region for detecting magnetic signals, that is, the regenerated voltage converted from the electric resistance corresponding to the change in the magnetic field. Therewith, unidirectional an isotropy appears in the middle region of the ferromagnetic film 101 as the magneto-resistance effect film by the antiferromagnetic film 102. Therefore, the middle region of the ferromagnetic film 101 is a detecting region 201, and the regions outside the middle region are nondetecting regions 301 which do not detect the magnetic signals. The detecting region 201 and the non-detecting region 301 under the electrodes 115 may be separated as shown in the figure.

In a case of the detecting region 201 which detects magnetic signals and the non-detecting region 301 which does not detect magnetic signals, the antiferromagnetic film vapor-deposited on the portion corresponding to the detecting region 201 has crystal structure of body-centered cubic lattice. The advantage in this case is to enrich the technology of this field.

On the other hand, the regenerated voltage obtained from the magneto-resistance effect film is signals from which a control means to be described later reads the information (data) recorded in the magnetic recording medium. The change in the resistance has a correlation with the change in the magnetic field generated by the data.

The antiferromagnetic film 102 is directly formed on the ferromagnetic film 101 as the magneto-resistance effect film so that the magneto-resistance effect film comes into a single magnetic domain state The antiferromagnetic film 102 is formed of a Cr alloy, or a Cr—Mn alloy, or a Cr—Mn—M alloy having crystal structure of body-centered cubic lattice. A longitudinal magnetic field is formed in the magneto-resistance effect film by the exchange coupling with the antiferromagnetic film, and the magneto-resistance effect film comes into a single magnetic domain state.

Barkhausen noise generated from the magneto-resistance effect film can be suppressed by the single magnetic domain state of the magneto-resistance effect film. The reason is that the single magnetic domain state of the magneto-resistance effect film suppresses the random movement of the magnetic domain wall in the magneto-resistance effect film which is the cause of Barkhausen noise.

The bias magnetic field vertical to a magnetic disk to be described later appears in the bias film 111 by applying the lateral bias magnetic field. With the bias magnetic field, the magnetization of the magneto-resistance effect film is changed to the lateral bias magnetic field inclined from the direction parallel to the medium. The lateral bias magnetic field has functions to make the magneto-resistance effect film in a linear response mode and at the same time to substantially improve the sensitivity of the magneto-resistance effect film. The bias film 111 for applying the lateral bias magnetic field is magnetically isolated from the ferromagnetic film 101 as the magneto-resistance effect film with the isolation film 112 as described above. It is well known that the lateral bias magnetic field may be applied by shunt bias, soft film bias or magnet bias.

Figure 8:
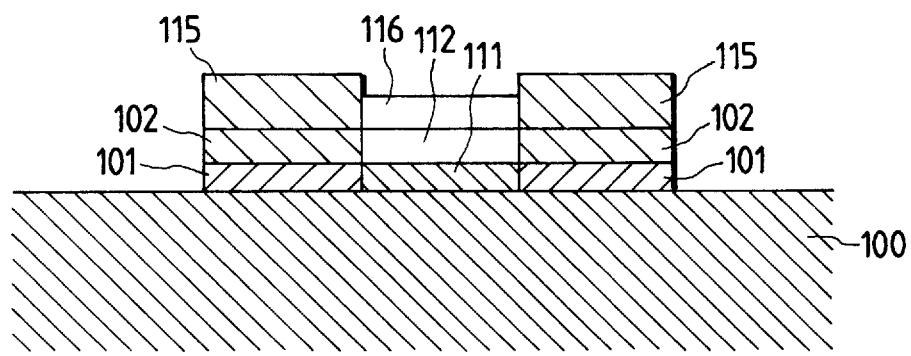
FIG. 8 is a cross-sectional view showing the structure of another embodiment of a magnetic transducer using a magnetic laminated film in accordance with the present invention.

FIG.8 is a cross-sectional view showing the structure of another embodiment of a magnetic transducer using a magnetic laminated film in accordance with the present invention. The magnetic transducer is constructed from a substrate 100, ferromagnetic films 101, antiferromagnetic films 102, electrodes 115, a bias film 111, an isolation film 112 and a magneto-resistance effect film 116. That is, the magnetic transducer comprises a first laminating film formed as a detecting region which is formed by successively laminating the bias film 111 for applying the lateral bias magnetic field, the isolation film 112 and the magneto-resistance effect film 116 on the substrate 100, and a second laminating film sandwiching the first laminating film which is formed by successively laminating the ferromagnetic films 101 for applying the lateral bias magnetic field and the antiferromagnetic films 102, and the electrode films laminated on the antiferromagnetic films 102 of the second laminating film. In other words, the divided ferromagnetic films 101 in both ends are vapor-deposited on the substrate 100 in sandwiching the bias film 111 to be applied with the lateral bias magnetic field placed in the middle. And the antiferromagnetic films 112 having crystal structure of body-centered cubic lattice and the electrodes 115 are closely laminated on the ferromagnetic films 101 on both sides. The isolation film 112 and the magneto-resistance effect film 116 are successively laminated on the bias film 111 in the middle. Therein, the magneto-resistance effect film 116 is constructed so as to adhere to both the ferromagnetic films 101 and the antiferromagnetic films 102. In this embodiment, the portion between the electrode 115 and the electrode 115, that is, the region corresponding to the middle portion described above is also the detecting region for detecting the regenerated voltage converted from the voltage change corresponding to change in the magnetic field. Therefore, the magneto-resistance effect film 116 is formed by etching so that the magneto-resistance effect film is placed only in the region substantially to receive the change in magnetic field from the medium.

The antiferromagnetic film 102 in the embodiment is also made of the Cr—Mn alloy of body-centered cubic lattice. Further, the alloy is preferably an alloy added with Pt, Pd or the like. The ferromagnetic film 101 is, for example, a Ni—Fe film. The ferromagnetic film 101 may be an alloy having crystal structure of body-centered cubic lattice. The ferromagnetic film 101 formed in adhering to the antiferromagnetic film 102 is magnetized in the direction parallel both to the magneto-resistance effect film 116 and to the surface of a magnetic disk to be described later. The magnetic field produced by the magnetized ferromagnetic film 101 renders the magneto-resistance effect film 116 into the single magnetic domain state Since the magneto-resistance effect film 116 is provided only in the detecting region where the resistance is changed by the magnetic field of the medium, the transducer in the embodiment is suitable for a magnetic head reading out signals recorded in a narrower recording track width. The reason is that such a magnetic head is hardly affected by signals recorded in the adjacent track and consequently does not misread even if the recording track width is narrow.

A conventional magnetic transducer of spin-valve structure will be described below.

In order to respond to the need for high sensitivity of magnetic transducers, there is a new type of magnetic transducer called a magnetic transducer of spin-valve structure. The base of the spin-valve structure is constructed from a fixed layer formed of a ferromagnetic film having a magnetization fixed toward a specified direction and a free layer formed of a ferromagnetic film having a magnetization direction freely rotatable laminated on the fixed layer through a thin non-magnetic layer. In this construction, the direction of spin of the conduction electrons in the fixed layer and the free layer changes the scattering probability of the conduction electrons, and consequently the electric resistance corresponding to the angle between the magnetization direction of the free layer and the magnetization direction of the fixed layer. Such a structure is called a spin structure.

The construction to closely laminate an antiferromagnetic film on a fixed layer in order to fix the magnetization of the fixed layer is well known. A spin-valve element is disclosed in Japanese Patent Application Laid-Open No. 6-111252 (1994), where the layer of antiferromagnetic film is separated from a magnetization fixed layer with a soft magnetic layer. Further, a magneto-resistance type head is described in an article entitled "Design, Fabrication and Testing of Spin-Valve Head for High Density Recording" by Ching Tsang et al., IEEE Transaction on Magnetics MAG-30, No. 6, November 1994, where the magneto-resistance type head utilizes spin-valve effect using a Fe—Mn film for an antiferromagnetic film, a thin Co film for a fixing layer and a Ni—Fe film for a free layer. The conventional antiferromagnetic films are of facecentered cubic lattice, and the spin-valve element having an antiferromagnetic film of body-centered cubic lattice is not known.

Figure 9:
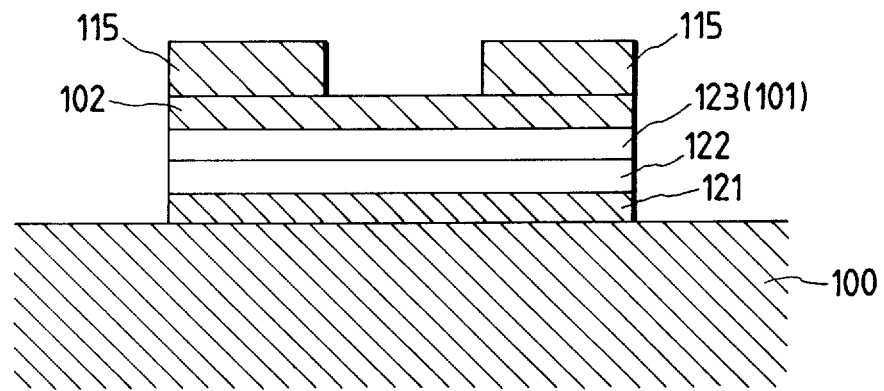
FIG. 9 is a cross-sectional view showing the structure of one embodiment of a magnetic transducer of a spin-valve structure using a magnetic laminated film in accordance with the present invention.

FIG.9 is a cross-sectional view showing the structure of one embodiment of a magnetic transducer of a spin-valve structure using a magnetic laminated film in accordance with the present invention. The spin-valve element used in the above magnetic transducer of spin-valve structure is constructed from a substrate 100, a free film 121, a non-magnetic film 122, a fixing film 123 as the ferromagnetic film 101, an antiferromagnetic film 102 and divided electrodes 115.

That is, the spin-valve element is constructed by forming the free film 121 as a second ferromagnetic film substantially freely changing the magnetizing direction corresponding to the external magnetic field, by forming the fixing film 123 as the ferromagnetic film 101 substantially fixing the magnetizing direction with the antiferromagnetic film 102 through the nonmagnetic film 122 for magnetically isolating the free film 121 made of a non-magnetic material, and further by successively laminating the antiferromagnetic film 102 and the divided electrodes 115 on the fixing film 123.

The ferromagnetic film 101 as the first ferromagnetic film is a magneto-resistance effect film made of a ferromagnetic material such as Fe, Fe—Ni or the like, and called a fixing film 123. Hereinafter, the ferromagnetic film 101 is referred to as the fixing film 123. The antiferromagnetic film 102 is made of a Cr—Mn alloy of bodycentered cubic lattice, and is preferably made of a Cr—Mn—Pt film The non-magnetic film 122 is made of a non-magnetic material such as, for example, Cu, and preferably Cr.

The fixing film 123 is given with unidirectional an isotropy by the antiferromagnetic film 102 formed by directly contacting the fixing film 123 and the direction of magnetization is fixed That is, the antiferromagnetic film 102 having crystal structure of body-centered cubic lattice is exchange-coupled with the fixing film 123 at the interface to fix the direction of magnetization in the fixing film 123 toward the magnetizing direction. Current for detecting the electric resistance is conducted to the element to detect the regenerated voltage.

The magnetizing here means that the direction of the spin in the antiferromagnetic film 102 is directed to a specified direction, and the following two methods are known. One of the methods is that a magnetic field directing a specified direction is applied to a ferromagnetic film while an antiferromagnetic film is being formed with sputtering method or the like. By employing such a film forming method under a magnetic field, the direction of spin in the antiferromagnetic film is directed toward the direction of the magnetic field during sputtering.

The other method is that after forming an antiferromagnetic film and a ferromagnetic film, the films are heat-treated under a magnetic field. The antiferromagnetic film is heat-treated together with the ferromagnetic film, and the direction of spin is aligned toward the direction of the magnetic field when the films are cooled down below the Neel temperature of the antiferromagnetic film. That is, the films are heated above the Neel temperature of the antiferromagnetic film and then the temperature is decreased while a magnetic field is applied to a specified direction. Thereby, the magnetization of the ferromagnetic film is fixed to the direction of the magnetic field applied from the external.

The fixing film 123 magnetically isolated with the non-magnetic film 122 is magnetized by the magnetization in the direction perpendicular to a magnetic disk to be described later. On the other hand, the free film 121 is formed so that the direction of the easy axis of magnetization becomes parallel to the magnetic disk. In the spin-valve element, the electric resistance of the fixing film 123 as a magneto resistance effect film changes corresponding to the angle between the magnetized directions of the fixing film 123 and the free film 121. When the angle is 0 (zero) degree, the electric resistance is minimum, and when the angle is 180 degrees, the electric resistance is maximum.

In order to obtain positive and negative regenerated voltages to positive and negative magnetic signals from the recording medium, in the initial state the angle between the magnetized directions of the fixing film 123 and the free film 121 is between 0 (zero) and 180 degrees. That is, the angle is preferably a right angle. The angle between the magnetized directions of the fixing film 123 and the free film 121 can be intersected at right angle by setting the magnetized direction of the fixing film 123 and the direction of the easy axis of magnetization of the free film 121 as setting in the embodiment.

The thinner the thickness of the non-magnetic film 122 is within the range in which the ferromagnetic coupling does not take place between the fixing film 123 and the free film 121, the larger the changing ratio of the magneto-resistance becomes and the higher the regenerated voltage becomes. In this embodiment, the thickness of the fixing film 123 is 2 nm, the thickness of the free film 121 is 5 nm, and the thickness of the non-magnetic film 122 is 1 nm.

The free film 121 as the second ferromagnetic film is required to easily rotate its direction of magnetization with the magnetic field of the recording medium, and made of a magnetic material such as Fe, Ni—Fe and so on. Among the materials, the Ni—Fe material is suitable since it is small in coercive force and easy in magnetization.

The fixing film 123 is not specially required to be an easy magnetization material as far as the magnetization is directed toward a specified direction, and may be made of a material having a comparatively large coercive force such as Fe alloys. In a case of using an alloy having crystal structure of body-centered cubic lattice such as a Fe alloy for the fixing film 123, it is possible to decrease the coercive force by employing an alloy of Fe added with another element, for example, a Fe—Si alloy. Therein, the materials for the free film 121 and the fixing film 123 are not limited to ferromagnetic materials.

Although a spin-valve element of simplest construction has been described in this embodiment, it is possible to construct an element having more number of laminating layers based on the structure of the embodiment.

The first advantage of employing a Cr—Mn film, preferably, a Cr—Mn—Pt film for the antiferromagnetic film 102 exchange-coupled with the fixing film 123 is that heat treating process is not required when manufacturing a spin-valve element having unidirectional an isotropy.

In manufacturing a conventional Ni—Mn film, a long time heat treatment is required. That is, in a Ni—Mn film of antiferromagnetic material having a practical corrosion resistivity, unidirectional an isotropy is not induced just after being vapor-deposited by sputtering or the like. The reason is that the Ni—Mn film can be an antiferromagnetic material under a high temperature only when the Ni—Mn film has crystal structure of face-centered cubic lattice, and the long time heat treatment at nearly 250° C. is required to form the crystal structure of face-centered cubic lattice. Further, there is a problem in that the long time heat treatment often deteriorates spin-valve effect due to mutual diffusion between the layers in certain materials of the spin-valve construction such as materials Ni—Fe/Cu/Ni—Fe.

On the other hand, even in a case of a conventional Fe—Mn film, the heat treatment is not required. However, in the case of the Fe—Mn film as an antiferromagnetic body not requiring such heat treatment, the unidirectional an isotropy is induced, but the film is easily corroded and it is difficult to obtain a practical corrosion resistivity. Further, the Fe—Mn alloy is a gamma-phase Mn alloy, and therefore it is required to provide a base film having a specified crystal structure in order to produce antiferromagnetism. In detail, the base film is a Ni—Fe film having crystal structure of face-centered cubic lattice or a metal film having crystal structure of face-centered cubic lattice. In other words, there is a problem in that the unidirectional an isotropy is not induced even if an antiferromagnetic film made of an Fe—Mn alloy of face-centered cubic lattice is formed on a metal having crystal structure of body-centered cubic lattice such as an Fe alloy.

As described above, the first advantage of the antiferromagnetic body having crystal structure of body-centered cubic lattice is in that the heat treatment process is not required and accordingly the manufacturing is easy and it is possible to attain a high corrosion resistivity and a high reliability.

The second advantage of the spin-valve element employing a Cr—Mn film, preferably, a Cr—Mn—Pt film according to the present invention for the antiferromagnetic film is in that a ferromagnetic film having crystal structure of body-centered cubic lattice can be used for the fixing film as the first ferromagnetic film since the antiferromagnetic film is of body-centered cubic lattice.

There is an Fe alloy for the ferromagnetic film having crystal structure of body-centered cubic lattice, and with the present invention, an Fe alloy can be used for the ferromagnetic film in a spin-valve element. The capability of using the Fe alloy (materials of Fe group) leads to the effect of expanding the width of material selection for the spin-valve element (one of factors enriching the technology in this field).

Further, the present invention results in improved thermal resistivity. In a conventional case of using an Fe—Mn film of face-centered cubic lattice for the antiferromagnetic film, it is necessary to use a Ni—Fe alloy film of face-centered cubic lattice for the ferromagnetic film as the fixing film as described above. Further, in a case of using a Ni—Fe film for the fixing film, the non-magnetic film is also required to be of face-centered cubic lattice, that is, required to use, for example, Cu of face-centered cubic lattice.

There is a problem in that in the spin-valve element using Cu for a non-magnetic film and Ni—Fe for a ferromagnetic film, the mutual diffusion between the films is apt to occur and the thermal resistivity is low. That is, the limiting temperature of such a spin-valve element is nearly 250° C. as described in an article entitled "Effect of Annealing on the Interfaces of Giant-Magneto resistance Spin-Valve Structures" by T. C. Huang et al., Applied Physics Letters, Vol. 62, No. 13, pages 1478 to 1480, (1993).

On the other hand, in a case of a spin-valve element according to the present invention using a Cr alloy of body-centered cubic lattice for the non-magnetic film and a Fe alloy of body-centered cubic lattice for both the fixing film and the free film, the thermal resistivity is improved.

In other words, the second advantage of the antiferromagnetic body having crystal structure of body-centered cubic lattice is improved thermal resistivity since the Cr alloy of body-centered cubic lattice is used for the non-magnetic film.

The reason is that it is thought the data on thermal resistivity in the following reference can be applied to the spin-valve element according to the present invention. That is, there is a paper in regard to thermal resistivity in a giant-magneto-resistance effect film of an Fe/Cr multi-film layer. Effect of heat treatment on multi-film layer is described in an article entitled "Fe/Cr Multilayers: Effect of Annealing on the Spin Structure and Magneto resistance" by W. Hahn et al., Journal of Applied Physics, Vol. 75, No. 7, pages 3564 to 3570, (1994). According to the paper, it is described that the changing ratio of magneto-resistance of the multifilm layer is not decreased by a heat treatment around 350°.

Although in the embodiments the term "film" is used such as ferromagnetic film, antiferromagnetic film, bias film, isolation film, fixing film, free film and so on, there is no need to say that the term "film" has the same meaning as the conventionally used term "layer" in such as ferromagnetic layer, antiferromagnetic layer and so on.

Figure 10:
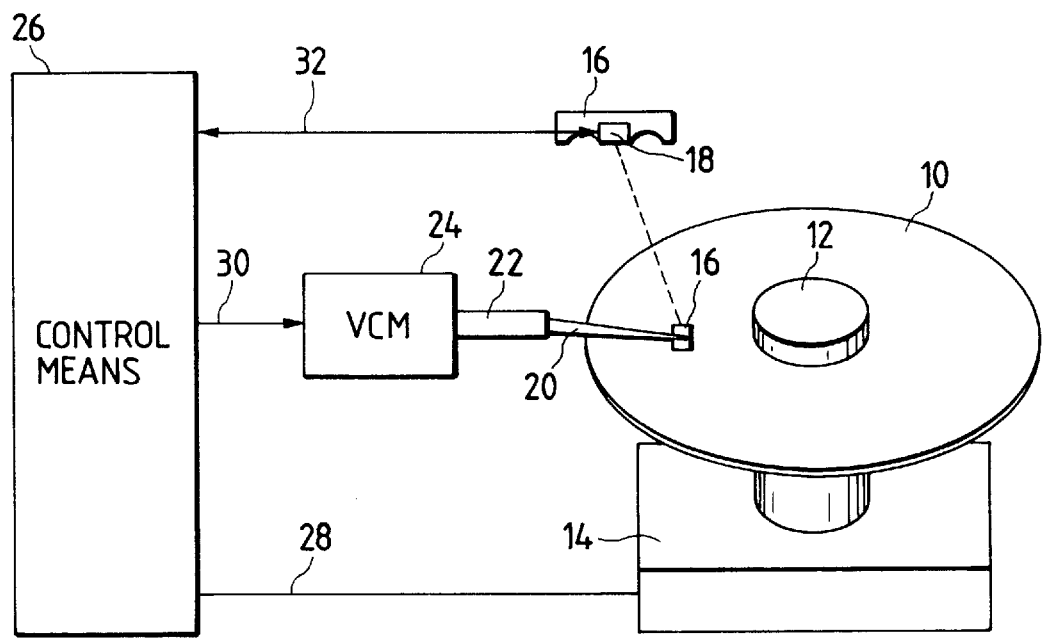
FIG. 10 is a view showing one embodiment of a magnetic disk device using a magnetic transducer in accordance with the present invention.

FIG. 10 is a view showing one embodiment of a magnetic disk device using a magnetic transducer in accordance with the present invention. The figure shows an outline in which the magnetic transducer according to the present invention is applied to a magnetic disk device as a magnetic recording device. However, it is obvious that the magnetic transducer according to the present invention is capable of applying a magnetic recording device such as a magnetic tape device.

The magnetic disk device shown in the figure comprises a magnetic disk 10 as a magnetic recording medium formed in a disk-shape for recording data to a recording region called tracks of concentric circles, a magnetic head 18 having a magnetic transducer according to the present invention for performing reading out and writing in the data, an actuator 24 for supporting the magnetic head 18 and moving the magnetic head to a proper position on the magnetic disk 10, and a control 26 for controlling transmitting/receiving of the data read out or written in by the magnetic head 18 and for controlling moving of the actuator 24.

The construction and operation of the magnetic disk device will be described below in detail. At least one rotatable magnetic disk 10 is supported with a rotating shaft 12 to be rotated by a driving motor 140 At least one slider 16 is positioned on the magnetic disk 10, and the slider 16 supports at least one of the magnetic heads 18 for reading and writing. As soon as the magnetic disk 10 is started to be rotated, the slider 16 is moved on the surface of the magnetic disk to access a proper position where an objective data is recorded. The slider 16 is attached to an arm 22 with a gimbals 20. The gimbals 20 has a small elasticity and allows the slider 16 to closely contact the magnetic disk 10. The arm 22 is attached to the actuator 24.

As to the actuator 24 shown in the figure, there is a voice coil motor (hereinafter, referred to as "VCM". The VCM has a movable coil placed in a steady magnetic field and the moving direction and the moving velocity of the coil are controlled by electrical signals given from the control means 26 through a line 30. Therefore, the actuating means according to the present invention is constructed from the slider 16, the gimbals 20, the arm 22, the actuator 24 and the line 30.

By rotation of the magnetic disk during operation of the magnetic disk device, an air bearing is produced due to air flow between the slider 16 and the magnetic disk 10 to float the slider from the surface of the magnetic disk 10. Therefore, during operation of the magnetic disk device, the air bearing supports the slider in balancing with the small elasticity of the gimbals 20 so that the slider 16 is supported not to contact the surface of the magnetic disk and is floated in keeping a constant spacing to the magnetic disk 10.

The control means 26 is, commonly, composed of a logic circuit, a memory, a micro-processor and so on. The control means 26 transmits and receives control signals through lines and controls various composing means of the magnetic disk device. For example, the motor 14 is controlled by motor driving signals transmitted through a line 28. The actuator 24 is controlled so as to properly move and position the selected slider 16 to an objective data track on the corresponding magnetic disk 10 with head position control signals and seek control signals and so on through the line 30.

Then the control means 26 receives and reads the electric signals which are read and converted from the data of the magnetic disk 10 by the magnetic head 18 through the line 32, and transmits the electric signals to be written in the magnetic disk 10 as data through the line 32. That is, the control means 26 controls transmitting and receiving of information (data) to be read or written by the magnetic head 18.

The signals to be read or written may be directly transmitted from the magnetic head 18. As to control signals, there are, for example, access control signals and clock signals. Further, the magnetic disk device may have a plurality of magnetic disks and actuators, and the actuator may have a plurality of magnetic heads.

Firstly, since the new type magnetic transducer according to the present invention has the following new effects, the field of using magnetic transducers can be expanded due to capability of selecting the increased kinds of magnetic transducers according to the purpose of use.

That is, since the crystal structure of an antiferromagnetic film made of Cr—Mn film or the like directly attached to a ferromagnetic film is body-centered cubic lattice which is different from a conventional Fe—Mn or Ni—Mn film, the material for the ferromagnetic film is not limited to face-centered cubic lattice or close hexagonal lattice or the like, but has expanded selecting freedom, which leads to improvement of productivity of magnetic transducers.

Since exchange coupling field is induced even if a Cr—Mn film is laminated on a Ni—Fe film, it is possible to replace a conventional Fe—Mn film with the Cr—Mn film.

Since the Cr—Mn film contains Cr, a fine oxide film is formed on the surface and accordingly the corrosion resistivity is improved compared to the Fe—Mn film or the like.

In the magnetic transducer of spin-valve structure having a fixing film of a Cr—Mn film, since exchange coupling field is induced without heat treatment of the Cr—Mn film, effect of heat treatment on the changing ratio of magneto-resistance is removed. Further, since the Neel temperature of the Cr—Mn film is as high as 250° C., the thermal resistivity is high.

Since Cr of body-centered cubic lattice can be used for the non-magnetic film by using Fe group alloys of body-centered cubic lattice for the fixing film and the free film, the thermal resistivity of the spin-valve element is further improved.

What is claimed is:

1. A magnetic transducer, comprising:
    multi-layers of a spin-valve structure including,
        a first ferromagnetic film having a magnetized direction fixed in a specific direction,
        a second ferromagnetic film having a magnetized direction freely changeable corresponding to changes of an external magnetic field,
        a non-magnetic film formed between said first and second films, for magnetically separating said first and second films, and
        an antiferromagnetic film made of Cr—Mn alloy of body-centered cubic lattice, for fixing the magnetized direction of said first ferromagnetic film, by generating exchange coupling with a contacting surface of said first ferromagnetic film and realizing unidirectional anisotropy in said first ferromagnetic film, the content of Mn in said Cr—Mn alloy being within the range of 30 to 70 atom %; and
    a pair of electrodes for establishing a current flow in said multi-layers;
    wherein said magnetic transducer detects changes of an external magnetic field, by sensing changes of electric resistance in said multi-layers, corresponding to an angle between two magnetized directions of said first and second ferromagnetic films.

2. A magnetic transducer according to claim 1, wherein said first ferromagnetic film is NiFe.

3. A magnetic transducer according to claim 1, wherein the content of Mn in said Cr—Mn alloy making said antiferromagnetic film further includes at least an additive element different from Cr and Mn.

4. A magnetic transducer according to claim 3, wherein the content of said additive element is more than 0 atom % and less than 30 atom %.

5. A magnetic transducer according to claim 3, wherein said additive element is at least one kind of element selected from the group of Co, Ni, Cu, Ag, Au and platinum group elements.

6. A magnetic transducer according to claim 5, wherein the content of said additive element is more than 0 atom % and less than 30 atom %.

7. A magnetic transducer, comprising:
    multi-layers of a spin-valve structure including,
        a first ferromagnetic film having a magnetized direction fixed in a specific direction,
        a second ferromagnetic film having a magnetized direction perpendicular to a magnetized direction of said first ferromagnetic film when an external magnetic field does not exist, and changeable corresponding to changes of an external magnetic field, a non-magnetic film formed between said first and second films, for magnetically separating said first and second films, and an antiferromagnetic film made of Cr—Mn alloy of body-centered cubic lattice, formed on said first ferromagnetic film substantially by a process of epitaxial growth, in which distances among atoms are the same as those of said first ferromagnetic film contacting said antiferromagnetic film, for fixing a magnetized direction of said first ferromagnetic film, the content of Mn in said Cr—Mn alloy being within the range of 30 to 70 atom %; and a pair of electrodes for establishing a current flow in said multi-layers;

wherein said magnetic transducer detects changes of an external magnetic field, by sensing changes of electric resistance in said multi-layers, corresponding to an angle between two magnetized directions of said first and second ferromagnetic films.

8. A magnetic transducer according to claim 7, wherein the content of Mn in said Cr—Mn alloy making said antiferromagnetic film further includes at least an additive element different from Cr and Mn.

9. A magnetic transducer according to claim 8, wherein the content of said additive element is more than 0 atom % and less than 30 atom %.

10. A magnetic transducer according to claim 8, wherein said additive element is at least one kind of element selected from the group of Co, Ni, Cu, Ag, Au and platinum group elements.

11. A magnetic transducer according to claim 10, wherein the content of said additive element is more than 0 atom % and less than 30 atom %.

12. A magnetic transducer, comprising:

multi-layers of a spin-valve structure including, a first ferromagnetic film having a magnetized direction fixed in a specific direction, a second ferromagnetic film having a magnetized direction freely changeable corresponding to changes of an external magnetic field, a non-magnetic film formed between said first and second films, for magnetically separating said first and second films, and an antiferromagnetic film made of Cr—Mn alloy of body-centered cubic lattice, for fixing the magnetized direction of said first ferromagnetic film, by generating exchange coupling with a contacting surface of said first ferromagnetic film and realizing unidirectional anisotropy in said first ferromagnetic film the content of Mn in said Cr—Mn alloy being within the range of 30 to 70 atom %; and a pair of electrodes for establishing a current flow in said multi-layers;

wherein said magnetized direction of said first ferromagnetic film which is fixed by said antiferromagnetic film, is substantially perpendicular to a direction of current flowing between said electrodes and also almost perpendicular to a magnetized direction of said second ferromagnetic film, and said magnetic transducer detects changes of an outside magnetic field, by sensing changes of electric resistance in said multi layers, corresponding to an angle between two magnetized directions of said first and second ferromagnetic films.

13. A magnetic transducer according to claim 12, wherein the content of Mn in said Cr—Mn alloy making said antiferromagnetic film further includes at least an additive element different from Cr and Mn.

14. A magnetic transducer according to claim 13, wherein the content of said additive element is more than 0 atom % and less than 30 atom %.

15. A magnetic transducer according to claim 13, wherein said additive element is at least one kind of element selected from the group of Co, Ni, Cu, Ag, Au and platinum group elements.

16. A magnetic transducer according to claim 15, wherein the content of said additive element is more than 0 atom % and less than 30 atom %.

* * * * *

UNITED STATES PATENT AND TRADEMARK OFFICE
CERTIFICATE OF CORRECTION

PATENT NO. : 5,872,690

DATED : 16 February 1999

INVENTOR(S) : Shigeru TADOKORO et al.

It is certified that error appears in the above-indentified patent and that said Letters Patent is hereby corrected as shown below:

| Column | Line | |
|---|---|---|
| 1 | 7 | Change "abandond" to --abandoned--. |
| 2 | 57 | Change "allay" to --alloy--. |
| 6 | 4 | Change "indicatens" to --indicates--. |
| 7 | 15 | After "field" delete "L". |
| 7 | 64 | After "disclosed" insert --.--. |
| 8 | 22 | Before "MR" delete ",". |
| 9 | 36 | After "state" insert --.--. |
| 11 | 51 | After "film" insert --.--. |
| 11 | 57 | After "fixed" insert --.--. |
| 14 | 66 | Change "motor 140" to --motor 14.--. |

UNITED STATES PATENT AND TRADEMARK OFFICE
CERTIFICATE OF CORRECTION

PATENT NO. : 5,872,690  Page 2 of 2
DATED : 16 February 1999
INVENTOR(S) : Shigeru TADOKORO et al.

It is certified that error appears in the above-indentified patent and that said Letters Patent is hereby corrected as shown below:

| Column | Line | |
|---|---|---|
| 18 | 10 | After "film" insert --,--. |
| 18 | 16 | After "film" (first occurrence) insert --,--. |

Signed and Sealed this

Ninth Day of November, 1999

Attest:

Q. TODD DICKINSON

Attesting Officer    Acting Commissioner of Patents and Trademarks